United States Patent [19]

Chang et al.

[11] Patent Number: 5,785,351
[45] Date of Patent: Jul. 28, 1998

[54] TRACTION DEVICE FOR WHEELED VEHICLE

[76] Inventors: Keun Ik Chang, 12171 NW. Sunningdale Dr.; Euiri Chang, 1899 NW. 143rd Ave., #K13, both of Portland, Oreg. 97229

[21] Appl. No.: 459,741

[22] Filed: Jun. 1, 1995

[51] Int. Cl.$^6$ ..................................................... B60S 9/00
[52] U.S. Cl. .......................... 280/757; 188/4 B; 301/42; 152/208
[58] Field of Search ........................... 280/727, 757; 188/4 R, 4 B; 301/38.1, 42; 152/208, 231, 232; 180/16

[56] References Cited

U.S. PATENT DOCUMENTS

| | | |
|---|---|---|
| 2,283,948 | 5/1942 | Ridgway ............................. 188/4 B |
| 2,815,828 | 12/1957 | Schaefer ............................. 188/4 B |
| 3,068,949 | 12/1962 | Sirois ................................. 188/4 B |
| 4,263,954 | 4/1981 | Dwinell ............................... 301/42 X |
| 4,621,712 | 11/1986 | Hardmark ......................... 152/208 X |
| 5,236,067 | 8/1993 | Inuzuka ................................. 180/16 |

*Primary Examiner*—Brian L. Johnson
*Attorney, Agent, or Firm*—Smith-Hill and Bedell

[57] ABSTRACT

A traction device for a wheeled vehicle comprises a rotor mounted to a supported component of the vehicle and displaceable between a deployed position, in which the rotor is close to the ground and in contact with the tire of a driven wheel of the vehicle so that when the tire rotates, the rotor rotates through frictional engagement therewith, and a stowed position, in which the rotor is farther from the ground and is spaced from the wheel. At least one elongate traction element is attached to the rotor at a location spaced from the axis of rotation of the rotor, so that when the rotor rotates due to frictional engagement with the rotating tire, the traction element is subject to centrifugal force and is extended from the rotor and passes between the tire and the ground.

17 Claims, 4 Drawing Sheets

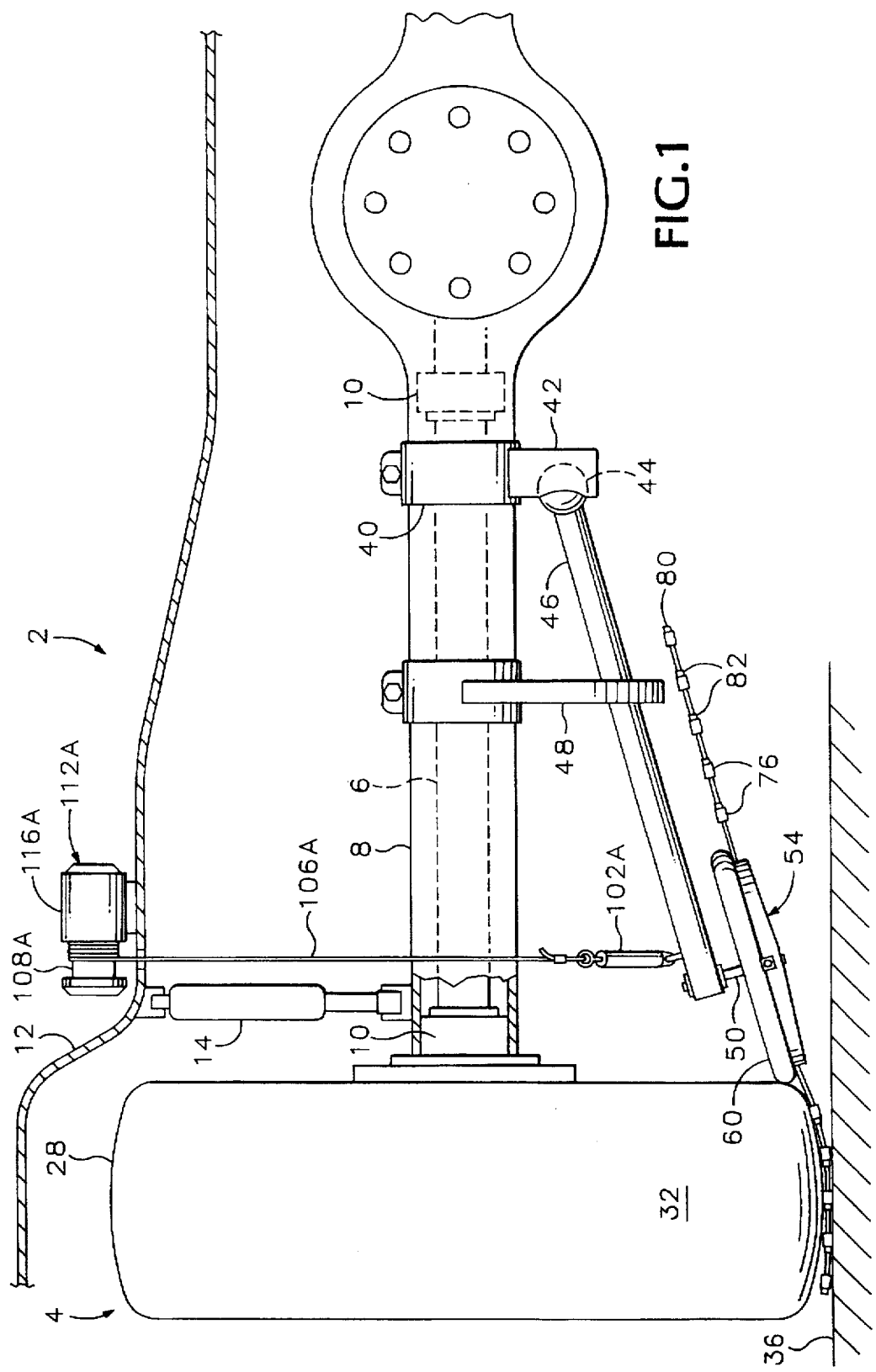

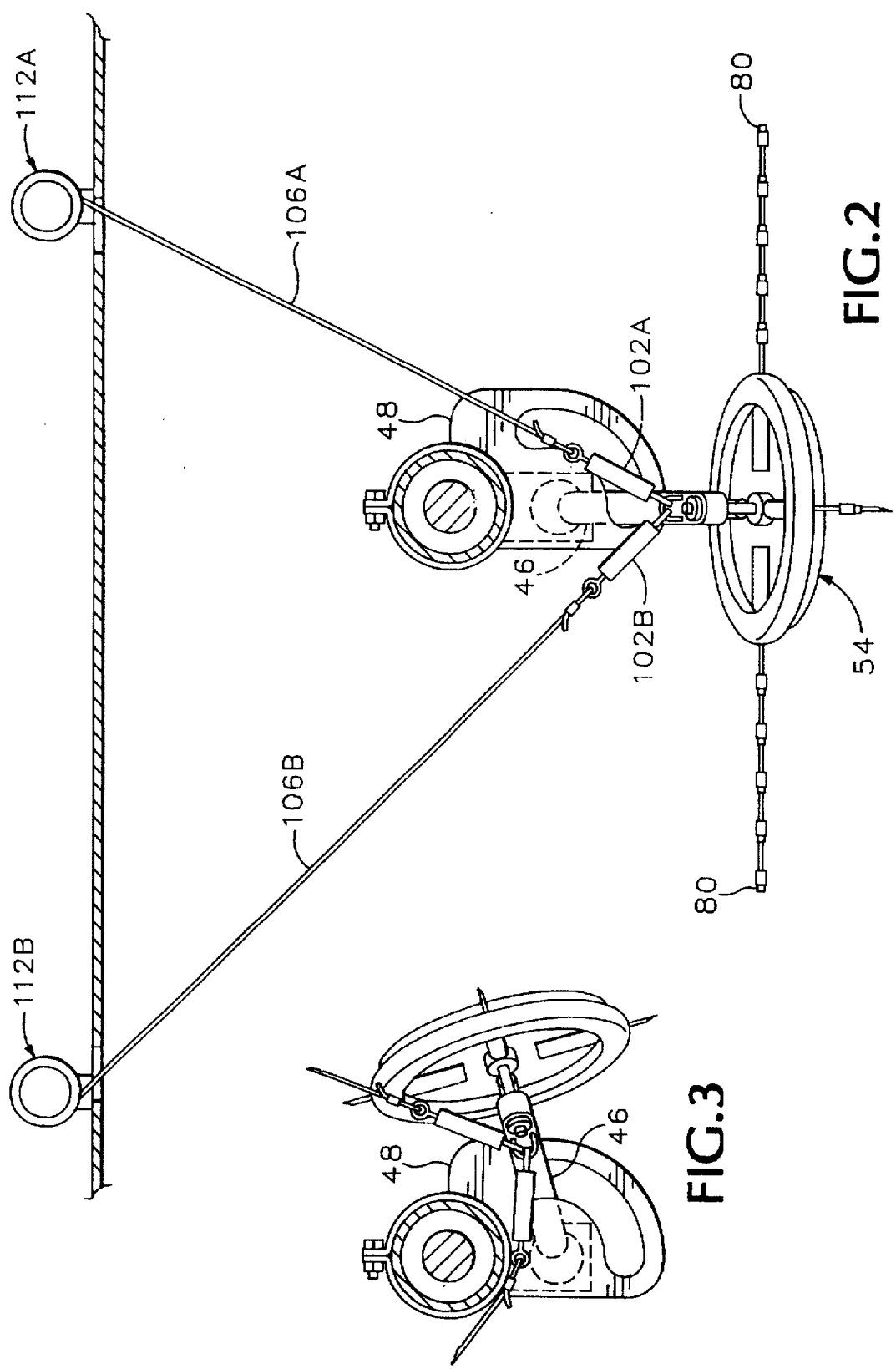

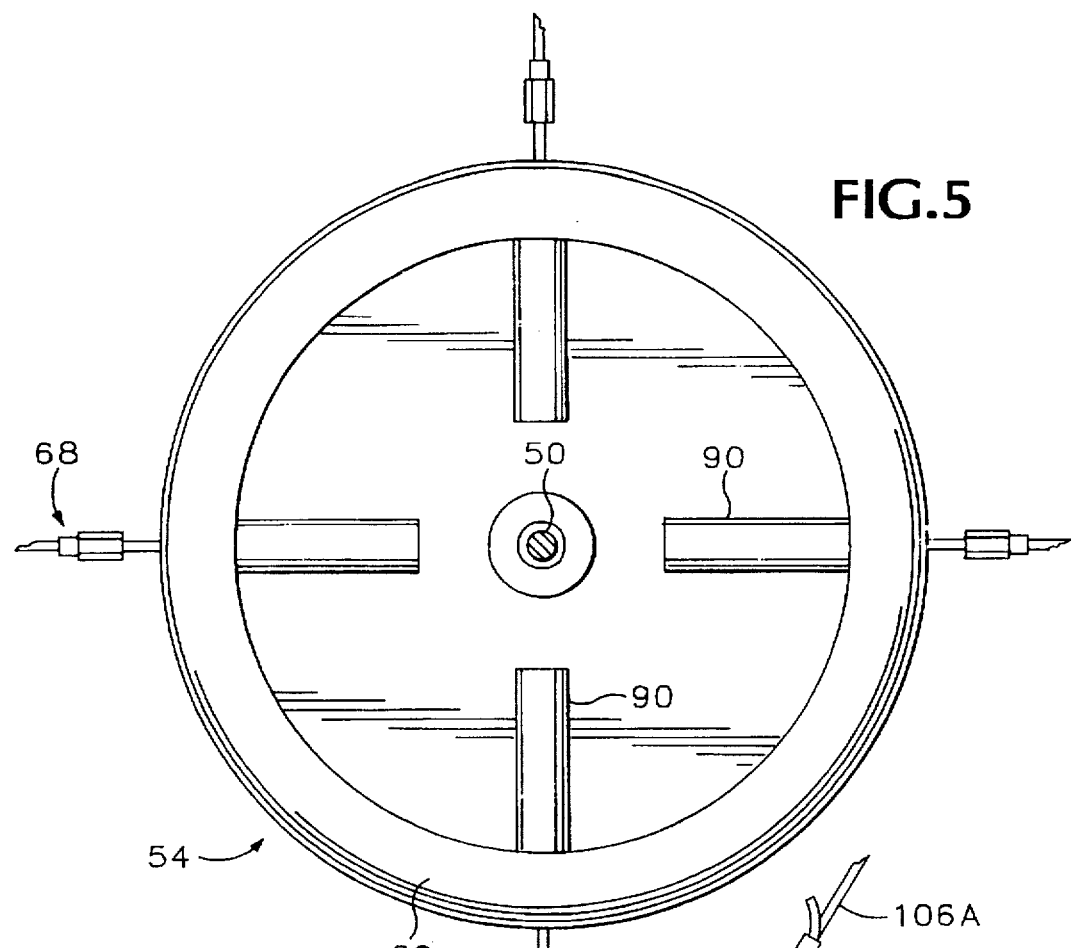
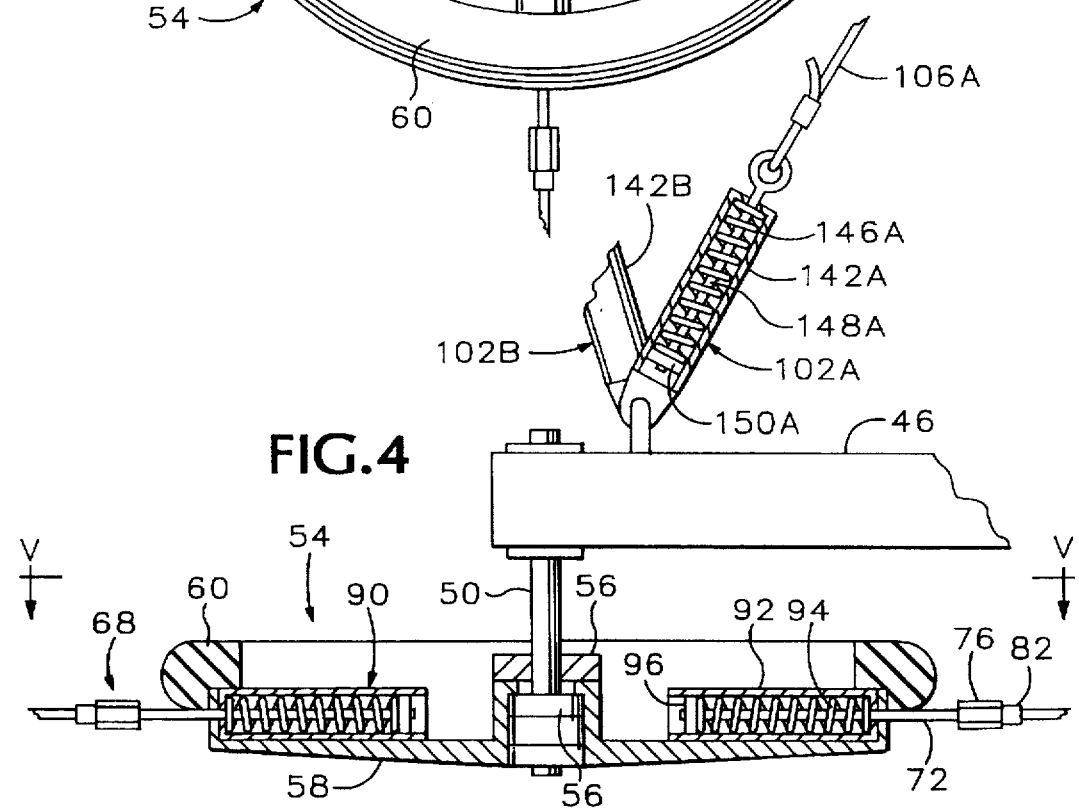

TRACTION DEVICE FOR WHEELED VEHICLE

BACKGROUND OF THE INVENTION

This invention relates to a traction device for a wheeled vehicle.

It is conventional to use tire chains to provide a wheeled vehicle, such as an automobile, with improved traction in snow and ice conditions. A tire chain typically comprises an inner retaining belt, an outer retaining belt, and several traction elements connecting the two retaining belts. In order to install the tire chain on the wheel of a vehicle, the chain is draped over the tire, with the traction elements extending across the tread of the tire and the inner retaining belt against the inner wall of the tire and the outer retaining belt against the outer wall of the tire. The two ends of the tire chain are brought close together at the bottom of the tire and the installer connects the two ends of the inner retaining belt together. He then attempts to connect the two ends of the outer retaining belt and tighten the outer retaining belt in order to take up slack in the chain and hold the traction elements snugly against the tread of the tire. In order to connect the ends of the inner retaining belt, the installer may need to kneel on the ground and reach behind the tire, working by touch rather than sight, to fit a ferrule into a small keyhole slot. Accordingly, the task of installing a tire chain is difficult and inconvenient under favorable conditions, and can be very awkward and seemingly impossible in the wet and cold conditions in which tire chains are normally necessary.

SUMMARY OF THE INVENTION

According to a first aspect of the present invention there is provided a traction device for a wheeled vehicle having a driven, ground engaging wheel supporting other components of the vehicle, the wheel including a tire and the traction device comprising a rotor mounted to a supported component of the vehicle and displaceable relative to the wheel between a deployed position, in which the rotor is close to the ground and in contact with the tire so that when the tire rotates, the rotor rotates through frictional engagement therewith, and a stowed position, in which the rotor is farther from the ground and is spaced from the wheel, and at least one elongate traction element attached to the rotor at a location spaced from the axis of rotation of the rotor, so that when the rotor rotates due to frictional engagement with the rotating tire, the traction element is subject to centrifugal force and is extended from the rotor and passes between the tire and the ground.

According to a second aspect of the present invention there is provided a wheeled vehicle comprising a driven, ground engaging wheel that supports other components of the vehicle, the wheel including a tire, and a traction device that comprises a rotor, an attachment means mounting the rotor to a supported component of the vehicle in a manner allowing displacement of the rotor relative to the wheel between a deployed position, in which the rotor is close to the ground and in contact with the tire so that when the tire rotates, the rotor rotates through frictional engagement therewith, and a stowed position, in which the rotor is farther from the ground and is spaced from the wheel, at least one elongate traction element attached to the rotor at a location spaced from the axis of rotation of the rotor, so that when the rotor rotates due to frictional engagement with the rotating tire, the traction element is subject to centrifugal force and is extended from the rotor and passes between the tire and the ground, and a displacement mechanism effective between the attachment means and the supported component of the vehicle for displacing the rotor between the deployed position and the stowed position.

BRIEF DESCRIPTION OF THE DRAWINGS

For a better understanding of the invention, and to show how the same may be carried into effect, reference will now be made, by way of example, to the accompanying drawings, in which FIG. 1 is a partial view of a vehicle equipped with a traction device that embodies the present invention, FIG. 2 is a partial side view of the vehicle illustrating the traction device in the deployed position, FIG. 3 is a partial side view of the vehicle illustrating the traction device in the stowed position, FIG. 4 is a sectional view of one component of the traction device, FIG. 5 is a view taken on the line V—V of FIG. 4.

DETAILED DESCRIPTION

Figure 6:
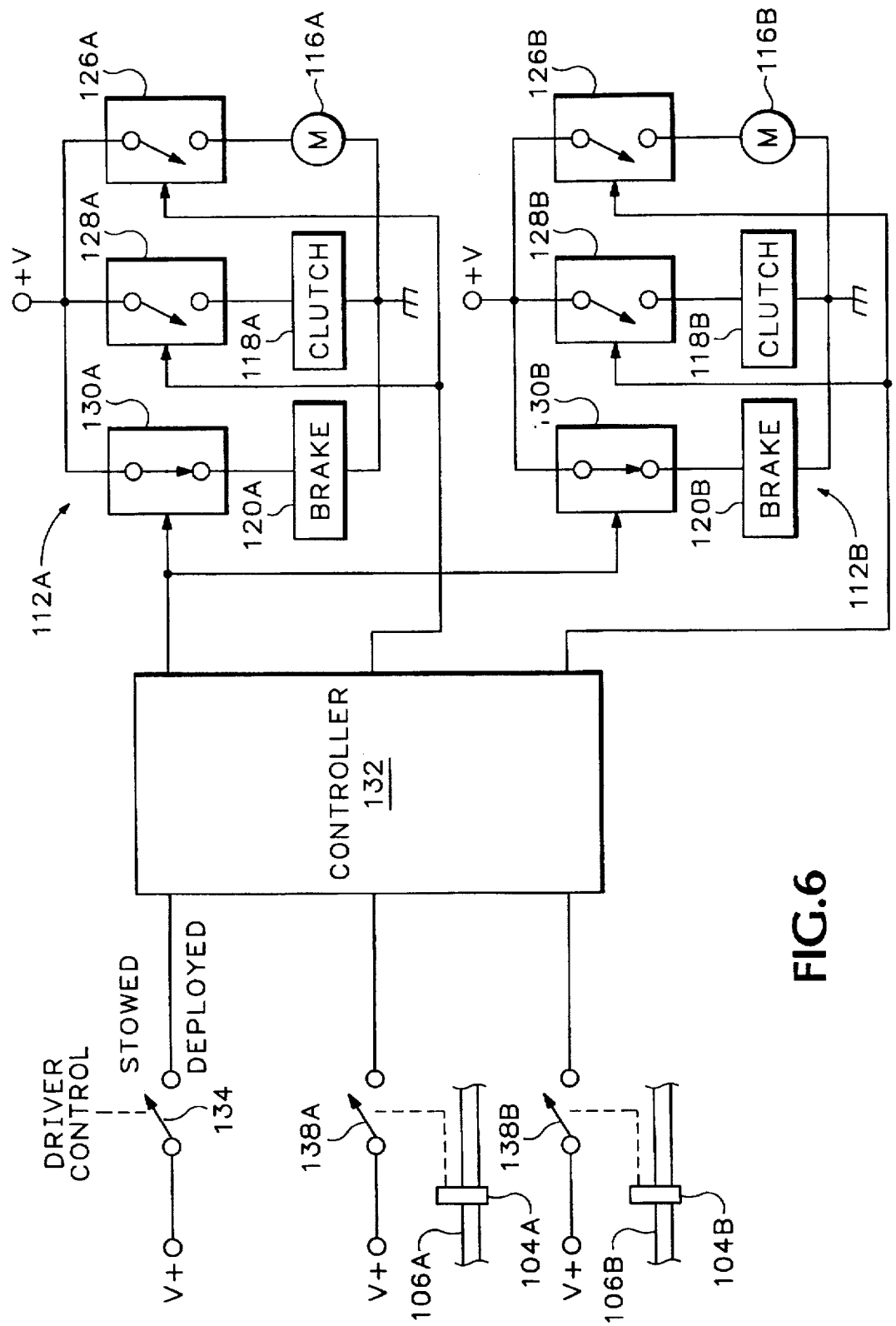
FIG. 6 is a simplified block schematic diagram illustrating a circuit for controlling movement of the traction device between the stowed position and the deployed position.

In the following description, the term "ground" means not only the hard pavement on which a vehicle may normally drive in dry conditions, but also a covering, such as snow or ice, that might interfere with traction between the tire tread and the pavement.

FIG. 1 illustrates partially a rear wheel drive vehicle 2 that has four wheels, of which only the left rear wheel is shown in FIG. 1. The illustrated wheel 4 includes a hub (not shown) that is connected to a half-shaft 6 for transmitting drive to the wheel from the engine (not shown). The half-shaft 6 is journalled within a rear axle housing 8 by bearings 10. The vehicle also includes a vehicle body 12 that is supported relative to the wheels by suspension components, including components 14 that are schematically illustrated in FIG. 1. A wheel rim is attached to the hub and a tire 28 is mounted on the wheel rim and has a tread 32 for engaging the ground 36. When the ground 36 is dry pavement and the half-shaft 6 is driven to rotate, frictional engagement of the tire tread 32 on the ground 36 causes the vehicle to move.

A collar 40 is secured to the rear axle housing 8 adjacent the differential casing, and a pivot support 42 projects downward from the collar. At its lower end, the pivot support 42 is connected by an articulated joint 44 to one end of an arm 46. The articulated joint allows the arm 46 to swing relative to the collar 40, and may be a universal joint or a ball-and-socket joint, for example. Movement of the arm 46 relative to the axle housing is guided by a guide frame 48, which has a slot that defines a curved path between a lower position, shown in FIGS. 1 and 2, in which the arm 46 extends downward from the pivot support 42 toward the area at which the tire tread 32 contacts the ground, and an upper position, shown in FIG. 3, in which the arm extends upward and rearward of the pivot support.

A spindle 50 is attached to the arm 46 at its outer end and extends downward from the arm toward the ground. A rotor 54 is mounted on the spindle 50 by means of bearings 56 (FIG. 4) that allow the rotor 54 to rotate but do not permit it to move axially of the spindle. The rotor comprises a circular metal frame 58 and a drive band 60 of rubber fitted to the frame 58 at the periphery thereof. When the arm 46 is in its lower position, the rotor is deployed so that the band 60 is in contact with the inner wall of the tire 28, and consequently the rotor 54 is driven through frictional engagement with the tire.

Four traction elements 68, similar to the traction elements of a conventional tire chain, are mounted on the rotor 54 at equiangularly spaced locations. Each traction element comprises a twisted-strand cable 72 and metal cleats 76, which may be of cylindrical form or of angular form, mounted on the cable. The cleats are retained on the cable by ferrules 80, and are separated into groups along the cable by additional ferrules 82. Preferably, the cleats 76 are freely rotatable about the cable.

When the arm 46 is in its upper position, the drive band 60 is out of engagement with the tire 28, and accordingly the rotor 54 is stowed and does not rotate. The traction elements hang freely from the rotor. When the arm 46 is in its lower position, the drive band 60 is in frictional engagement with the tire wall and consequently the rotor 54 is driven to rotate about the central axis of the spindle 50. As the rotor spins, centrifugal force causes the traction elements to extend from the rotor, and each traction element is flung in turn into the wedge-shaped space that is formed between the tire tread 32 and the ground 36 and is forward (relative to the intended direction of motion of the vehicle) of the area at which the tire tread contacts the ground. As the tire rotates, the engagement of the cleats 76 with the tire tread results in the traction element being forced between the tire tread and the ground, providing traction therebetween. When the tire tread has passed over the traction element, the traction element is released from engagement between the tire tread and the ground and is pulled out to the rear of the contact area by continuing rotation of the rotor. As the rotor continues to rotate, the traction element is again flung into the wedge-shaped space that is forward of the area in which the tire tread contacts the ground.

Preferably, the rotor 54 includes a spring buffer 90 for each traction element. Each spring buffer 90 comprises a cylindrical spring housing 92 and a helical compression spring 94 accommodated in the housing. The cable 72 extends through the spring 94 and a spring retainer 96 is attached to the cable at its inner end. If the wheel is turning only slowly, which implies that there is adequate traction between the tire tread and the ground, the centrifugal force exerted by the traction elements is insufficient to compress the springs 94 and so the springs retract the traction elements toward the rotor, and the traction elements do not extend fully under the tire. On the other hand, if the wheel is spinning rapidly, which implies that there is insufficient traction between the tire tread and the ground, the centrifugal force is large enough to compress the springs 94, and accordingly the traction elements extend farther under the tire tread and provide stronger frictional engagement between the tire tread and the ground.

Two electrically driven winches 112A and 112B are mounted within the vehicle body. Each winch 112 has a capstan 108, a motor 116, a clutch 118 that couples the motor to the capstan, and a brake 120 for locking the capstan against rotation.

The outer end of the arm 46 is connected through two buffer spring mechanisms 102A, 102B to cables 106A, 106B respectively. The cables 106A, 106B have opposite end segments wrapped around the capstans 108A, 108B of the winches 112A, 112B respectively.

Referring to the block schematic diagram shown in FIG. 6, the motor, clutch, and brake of each winch are controlled by respective switches 126, 128 and 130, and the switches 126, 128, and 130 are controlled by a controller 132. The state of the controller 132 depends on a switch 134 that is controlled by the driver of the vehicle and on two limit switches 138A and 138B that are controlled by stop arms 140 and 140B carried by the cables 106A and 106B respectively.

When the arm 46 is in the upper position and the driver does not call for traction assistance, the switch 134 is open and the limit switch 138A is open. The controller 132 holds the switches 126, 128, and 130 open and accordingly the motors 116 are off, the clutches 118 are disengaged, and the brakes 120 are engaged. The arm 46 is thereby held against pivotal movement from the upper position. When the driver closes the switch 134 and thereby gives the controller 132 a command indicating that traction assistance is required, the controller closes the switch 130A so that the brake 120A is disengaged and the arm 46 is able to swing down under its own weight from the upper position to the lower position and the rotor moves to its deployed position. The controller also closes the switches 126B, 128B, and 130B, so that the brake 120B is disengaged, the clutch 118B is engaged, and the motor 116B is switched on, and so slack in the cable 106B is wound onto the capstan of the winch 112B. The position of the stop arm 140B on the cable 106B is such that when the arm 46 reaches its lower position, the stop arm 140B engages the limit switch 138B. Thereupon, the controller opens the switches 126B, 128B, 130A, and 130B so that the clutch 118B is disengaged, the motor 116B is switched off, and the brakes 120A and 120B are engaged.

When traction assistance is no longer required, the driver opens the switch 134 and thereby issues a command to the controller to return the arm 46 to the upper position. The controller responds by closing the switches 130A and 130B, and opening the switches 126A and 128A, so that the brakes 120 are disengaged, the clutch 118A is engaged, and the motor 120A is energized. The capstan of the winch 112A is driven to wind the cable 106A onto the capstan and pull the arm 46 up to its upper position, while the capstan of the winch 112B rotates freely. In this manner, the rotor 54 is displaced from its deployed position to its stowed position. When the stop arm 140A engages the limit switch 138A, the clutch 118A is disengaged, the motor 120A is switched off, and the brakes 116A and 116B are engaged, and the arm 46 is therefore held in the upper position until the driver closes the switch 134 again.

Due to the rotation of the rotor and the continuous feeding of successive traction elements into the space between the tire tread and the ground, there is a possibility that when the switch 134 is changed to its open condition, to engage the clutches and drive the winch motors, there will be substantial forces resisting movement of the arm 46 from its lower position to its upper position. The spring buffer 102A protects the motor 116A of the winch 112A from overload by allowing the winch to operate without any movement of the arm 46. Each spring buffer 102 comprises a cylindrical spring housing 142 that contains a helical compression spring 146, a rod 148 that extends through the housing 142, and a retainer 150 on the end of the rod. The housing 142 is attached to the arm 46 and the cable 106 is attached to the outer end of the rod 148. In the event that swinging movement of the arm 46 from its lower position toward its upper position is prevented, for example by a traction element being trapped between the tire tread and the ground, the spring 146A is compressed and therefore the winch 112A is able to operate against the force of the spring and is not subject to overload owing to the arm being unable to move. As the tire rolls over a given traction element, the tension in the cable 106A exerts a force on the outer end of the arm 46 that pulls the arm somewhat toward its upper position, and so the arm is pulled out of engagement with the tire wall. Once the rotor stops turning, the traction elements are no longer fed between the tire tread and the ground and the tension exerted on the outer end of the arm 46 progressively pulls the arm toward its upper position as permitted by the traction elements being released by the tire. When all the traction elements have been released, the arm is easily pulled to its upper position. Similarly, in the event that the rotor is forced to the rear by frictional engagement with the tire, the spring buffer 102B absorbs the force and allows movement of the arm without necessitating rotation of the capstan of the winch 112B.

It will be appreciated that the invention is not restricted to the particular embodiment that has been described, and that variations may be made therein without departing from the scope of the invention as defined in the appended claims and equivalents thereof. For example, the invention is not restricted to the rotor being mounted on a pivotal arm or to the use of electric winches to move the rotor between its deployed position and its stowed position, because the rotor could instead be mounted on a double-acting hydraulic cylinder that displaces the rotor linearly between its stowed position and its deployed position. The winches could be provided with protective circuits that limit supply of current to the motors and thereby prevent overload.

We claim:

1. A wheeled vehicle having a vehicle body, a driven, ground engaging wheel supporting the vehicle body and including a tire, and a traction device comprising:

a rotor having an axis of rotation, an attachment means mounting the rotor to the vehicle body and allowing the rotor to be displaced relative to the wheel between a deployed position, in which the rotor is in contact with a lower portion of the tire so that when the tire rotates, the rotor rotates about its axis of rotation through frictional engagement with the tire, and a stowed position, in which the rotor is above said lower portion of the tire and is spaced from the wheel, the attachment means comprising a pivot arm having a first end at which it is attached to the vehicle body in a manner allowing pivotal movement of the pivot arm relative to the vehicle body and a second end to which the rotor is attached, at least one elongate traction element attached to the rotor and having an inner portion that is disposed substantially radially with respect to the rotor and an outer portion that projects radially beyond the rotor, so that when the rotor rotates due to frictional engagement with the rotating tire, the traction element is subject to centrifugal force and the outer portion of the traction element is extended from the rotor and passes beneath the tire, and a displacement mechanism connected between the attachment means and the vehicle body for displacing the rotor between the deployed Position and the stowed position, the displacement mechanism comprising a cable, a winch having a retracting condition in which it drives a winch capstan to rotate in a first direction for winding the cable onto the capstan and a coasting condition in which it allows the capstan to rotate in the opposite direction, and a buffer spring mechanism connected between the cable and the pivot arm for protecting the winch from an overload condition, said buffer spring mechanism comprising a cylindrical housing and a helical compression spring fitted in the housing.

2. A vehicle according to claim 1, comprising a plurality of elongate cable chain traction elements attached to the rotor at equiangularly spaced locations about the axis of rotation of the rotor.

3. A vehicle according to claim 1, wherein the traction element comprises a flexible cable and a plurality of cleats mounted on the cable and freely rotatable about the cable.

4. A vehicle according to claim 3, wherein the traction element comprises a flexible cable and a plurality of cleats mounted on the cable, and at least one ferrule fitted to the cable and separating the cleats into two groups.

5. A vehicle according to claim 4, wherein the cleats are freely rotatable on the cable.

6. A vehicle according to claim 1, further comprising an expansion spring by which the traction element is attached to the rotor.

7. A vehicle according to claim 1, wherein the rotor includes a cylindrical housing extending radially thereof and a compression spring fitted in the housing, and the inner portion of the traction element is accommodated in the cylindrical housing and the compression spring acts against the traction element to urge it radially inward.

8. A vehicle according to claim 1, wherein the rotor comprises a circular frame and a friction band extending around a peripheral region of the circular frame.

9. A vehicle according to claim 1, wherein the traction element comprises a flexible cable and a plurality of angular cleats mounted on the cable and freely rotatable about the cable.

10. A vehicle according to claim 1, wherein the traction element comprises a flexible cable and a plurality of cylindrical cleats mounted on the cable and freely rotatable about the cable.

11. A vehicle according to claim 7, wherein the traction element comprises:

a flexible cable that passes through an interior space of the compression spring and has an inner end which is radially inward of the compression spring and an outer end which is radially outward of the compression spring, and a spring retainer attached to the cable at its inner end, and wherein the compression spring has an inner end and an outer end and the inner end of the compression spring engages the spring retainer.

12. A vehicle according to claim 11, wherein the traction element further comprises a plurality of cleats mounted on the cable and freely rotatable about the cable.

13. A wheeled vehicle comprising:

a vehicle body, a driven, ground engaging wheel that supports the vehicle body, the wheel including a tire, and a traction device that comprises a rotor having an axis of rotation, an attachment means mounting the rotor to the vehicle body in a manner allowing displacement of the rotor relative to the wheel between a deployed position, in which the rotor is in contact with a lower portion of the tire so that when the tire rotates, the rotor rotates about its axis of rotation through frictional engagement therewith, and a stowed position, in which the rotor is above said lower portion of the tire and is spaced from the wheel, at least one elongate traction element attached to the rotor at a location spaced from the axis of rotation of the rotor, so that when the rotor rotates due to frictional engagement with the rotating tire, the traction element is subject to centrifugal force and is extended from the rotor and passes between the tire and the ground, and a displacement mechanism connected between the attachment means and the vehicle body for displacing the rotor between the deployed position and the stowed position, said displacement mechanism comprising a cable, a winch having a retracting condition in which it drives a winch capstan to rotate in one direction for winding the cable onto the capstan and a coasting condition in which it allows the capstan to rotate in an opposite direction, and a buffer spring mechanism connected between the cable and the attachment means for protecting the winch from an overload condition, said buffer spring mechanism comprising a cylindrical housing and a helical compression spring fitted in the housing.

14. A vehicle according to claim 13, wherein the attachment means comprises a pivot arm having a first end at which it is attached to the vehicle body in a manner allowing pivotal movement of the pivot arm relative to the vehicle body and a second end to which the rotor is attached, and the buffer spring mechanism is connected between the cable and the second end of the pivot arm.

15. A vehicle according to claim 13, comprising a plurality of elongate traction elements attached to the rotor at equiangularly spaced locations about the axis of rotation of the rotor, and wherein each traction element comprises a flexible cable and angular metal cleats mounted on the cable.

16. A vehicle according to claim 13, further comprising an expansion spring by which the traction element is attached to the rotor.

17. A vehicle according to claim 13, wherein the rotor includes a cylindrical housing extending radially thereof and a compression spring fitted in the housing, and wherein the inner portion of the traction element is accommodated in the cylindrical housing and the compression spring acts against the traction element to urge it radially inward.

* * * * *